(12) United States Patent
Keesara et al.

(10) Patent No.: US 9,088,506 B2
(45) Date of Patent: Jul. 21, 2015

(54) SYSTEM AND METHOD FOR DATA STREAM MIRRORING

(75) Inventors: Srikanth Keesara, Tewksbury, MA (US); Richard Thomas Strong, Amherst, NH (US); Brian Thomas Bull, Milford, NH (US)

(73) Assignee: AVAYA, INC., Basking Ridge, NJ (US)

( * ) Notice: Subject to any disclaimer, the term of this patent is extended or adjusted under 35 U.S.C. 154(b) by 199 days.

(21) Appl. No.: 13/610,321

(22) Filed: Sep. 11, 2012

(65) Prior Publication Data

US 2014/0075041 A1  Mar. 13, 2014

(51) Int. Cl.
G06F 15/173 (2006.01)
H04L 12/931 (2013.01)
H04L 12/26 (2006.01)

(52) U.S. Cl.
CPC ............... *H04L 49/20* (2013.01); *H04L 43/00* (2013.01)

(58) Field of Classification Search
None
See application file for complete search history.

(56) References Cited

U.S. PATENT DOCUMENTS

| | | | |
|---|---|---|---|
| 6,041,042 A | 3/2000 | Bussiere | |
| 2002/0037006 A1* | 3/2002 | Sampath et al. | 370/389 |
| 2003/0145102 A1* | 7/2003 | Keller-Tuberg | 709/237 |
| 2005/0021574 A1* | 1/2005 | Miller et al. | 707/204 |
| 2005/0114522 A1 | 5/2005 | LaVigne et al. | |
| 2006/0176880 A1* | 8/2006 | Bare et al. | 370/392 |
| 2007/0294274 A1* | 12/2007 | Kano | 707/101 |
| 2008/0151911 A1* | 6/2008 | Chen | 370/400 |
| 2010/0306303 A1* | 12/2010 | Matsuo | 709/202 |
| 2011/0299532 A1* | 12/2011 | Yu et al. | 370/392 |

OTHER PUBLICATIONS

Cisco, Catalyst 3550 Mulitlayer Switch Software Configuration Guide, , Cisco IOS Release 12.1(13)EA1, Mar. 2003. www.cisco.com/c/en/us/td/docs/switches/lan/catalyst3550/software/release/12-1_13_eal/configuration/guide/3550scg.pdf.*
Cisco Catalyst 3550 Multilayer Switch Software Configuration Guide,Cisco IOS Release 12.1(EA1), Mar. 2003.*
GB Search Report dated Dec. 4, 2013, 6 pages.

* cited by examiner

*Primary Examiner* — Chris Parry
*Assistant Examiner* — Stephen Houlihan
(74) *Attorney, Agent, or Firm* — Anderson Gorecki & Rouille LLP

(57) ABSTRACT

A mirroring configuration employs an alternate usage of an existing messaging protocol and mechanism for propagating mirroring control for remote mirroring of data streams. A source routing entity, i.e. a router or switch through which the mirrored stream passes, identifies the stream as available for monitoring. The enabled stream propagates from a source network device, typically from a router port, to a mirroring destination in addition to the addressed destination. A stream identifier emulates an identifier from an alternate usage, such as a multicast group identifier for a multicast protocol, and activates mirroring by inserting the stream identifier in publish and join messages of the multicast protocol.

20 Claims, 5 Drawing Sheets

SYSTEM AND METHOD FOR DATA STREAM MIRRORING

BACKGROUND

Data stream mirroring provides a duplication of a stream of data packets to an alternate destination in addition to a primary destination. Mirroring may be employed for debugging and diagnoses of network traffic anomalies, security and surveillance, and as a failover or redundancy path for critical data. Mirroring involves identification of a source stream, typically designated as a router port and optionally with filtering to restrict particular source or destination addresses, for example. The mirroring setup also designates a mirroring destination as the recipient of the mirrored stream, resulting in a duplicate packet for each packet in the identified source stream.

SUMMARY

A mirroring configuration employs an alternate usage of an existing messaging protocol and mechanism for propagating mirroring control for remote mirroring of data streams. A source routing entity, i.e. a router or switch through which the mirrored stream passes, identifies the stream as available for mirroring. The enabled stream propagates from a source network device (source), typically from a router port, to a mirroring destination in addition to the addressed destination. A stream identifier emulates an identifier from an alternate usage, such as a multicast group identifier for a multicast protocol, and activates mirroring by inserting the stream identifier in publish and join messages of the multicast protocol.

Configurations herein are based, in part, on the observation that mechanisms for managing the configuration of remote mirroring are cumbersome and most often require the configuration of multiple network elements (switches, routers etc) for each stream of traffic that needs to be mirrored. Unfortunately, conventional arrangements suffer from the shortcoming that multiple configuration actions need occur at multiple locations depending on the location of the routing entities (routers/switches, etc) designated as the source of the mirrored stream and the destination recipients of the mirrored stream. Disabling mirroring likewise requires a reversal of these actions or unnecessary bandwidth remains allocated to mirroring activities. Accordingly, configurations herein substantially overcome the above described shortcomings by employing a multicast routing protocol in combination with IGMP as the control plane for mirroring applications.

As indicated above, mirroring involves tedious and time consuming configuration at each routing entity concerned. Typically, this entails manual intervention by an operator for each of the source routers and the routers serving the capture entities, in addition to configuring the capture device itself (typically a PC with ample recording capacity on a hard drive). Configurations disclosed herein employ a multicast routing protocol for identifying streams for mirroring and commencing mirroring from a remote mirroring destination (capture entity) by specifying the identified stream. In operation, the mirroring information emulates multicast routing information so that mirroring information propagates via the multicast routing protocols and allows remote mirroring to be enabled from the remote capture device by capitalizing on the mirroring information emulating the multicast information.

In further detail, the method of performing remote mirroring as disclosed herein includes designating at least one stream of traffic enabled for remote mirroring, and receiving a message for commencing mirroring, such that the received message is indicative of the designated stream for mirroring and a destination to which the mirrored stream is to be sent. Designating the stream for mirroring further includes assigning an identifier to the stream, such that the assigned identifier circumvents an alternate usage of the identifier. In the example arrangement, multicast routing is the alternate usage and the assigned identifier is an IGMP group address. Other alternate usages may be employed.

In an example arrangement, the following setup and configuration allows remote mirroring from a remote host as disclosed herein:

1. User configures or enables Mirroring on a stream 112 of traffic using supported network management methods on a switch/router.
2. The switch/router assigns a (IP SA, IP Multicast DA) as the identifier 121 to represent the mirror stream 112.
3. The switch/router 110 announces the (IP SA, IP Multicast DA) using a multicast routing protocol 127 there by letting the other switches and routers in the network know about the availability of the mirror stream.

Once the identifier is assigned and published,

1. User at a Host 126 connected to a Mirror Destination 124 decides that the Mirror Stream should be received by the Host.
2. Host 126 uses IGMP to request the (IP SA, IP DA) representing the Mirror Stream from switch/router that the Host is connected to.
3. The switch/router connected to the Host uses the multicast routing/protocol of the Network to request the stream from its origination point.

This allows the host 126 to designate and indicate interest in the mirrored stream. To provide the mirrored stream to the host:

1. The switch/router 110 at the mirror origination point receives a request 162 using the multicast routing protocol to deliver the stream.
2. The switch/router 110 at the origination point starts sending the stream towards the switch/router connected to the mirror destination.

Alternate configurations of the invention include a multi-programming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example of remote mirroring according to configurations disclosed herein. Remote mirroring is employed for troubleshooting and monitoring message traffic in computer networks. Remote mirroring allows traffic in any part of the network to be copied and delivered to another point where it could monitored/analyzed/recorded etc. Configurations disclosed below facilitate the configuration and management aspects of remote mirroring.

The conventional approaches often involve tedious configuration of multiple network elements per stream of traffic that needs mirroring. They are either error prone when manually performed and/or increase expense due to specialized network management applications to manage remote mirroring. Being configuration driven—which tends to be static— the conventional solutions also result in wasted bandwidth for mirroring even when the mirror destinations are not active. Generally, there is not an established network control plane for managing mirroring.

Figure 1:
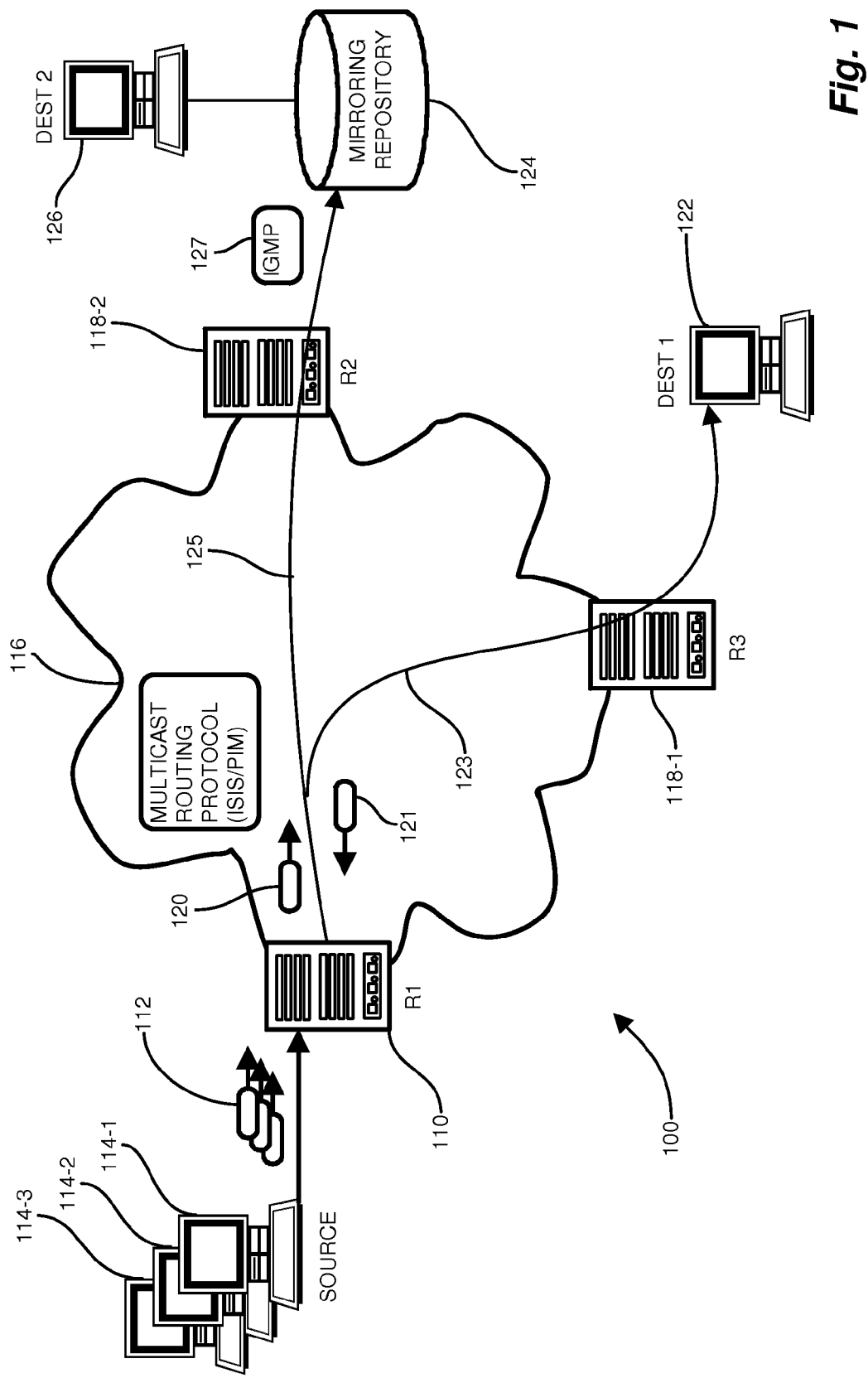
FIG. 1 is a context diagram of a mirroring environment suitable for use with configurations herein.

FIG. 1 is a context diagram of a mirroring environment suitable for use with configurations herein. Referring to FIG. 1, in a mirroring environment 100, a source router 110 (source) receives message traffic 112 from source network entities 114-1 . . . 114-N via a core network 116. User devices (PCs) are illustrated as example source network entities 114. However the mirrored traffic may emanate from any suitable source. The source router 110 distinguishes mirrored traffic based on a port and filter or other suitable selection, and thus may denote mirrored traffic based on factors such as source, destination or other basis. The identified mirrored traffic 120 travels to an intended destination 122 via destination routers 118-1 and 118-2 (118 generally), shown by main traffic path 123 and also to a mirrored destination 118-2 via a mirroring path 125, typically a capture device 124 such as a disk or other suitable mirroring repository, which may be under the control of a host 126 requesting the mirroring. The host 126 initiates mirroring, via commands discussed below and an assigned identifier 121 of the mirrored stream, and may or may not be co-located with the capture device 124. In the example arrangement, an alternate usage protocol or application exists within the network, such as multicast group protocols including IGMP 125, or other suitable alternatives discussed below.

Figure 2:
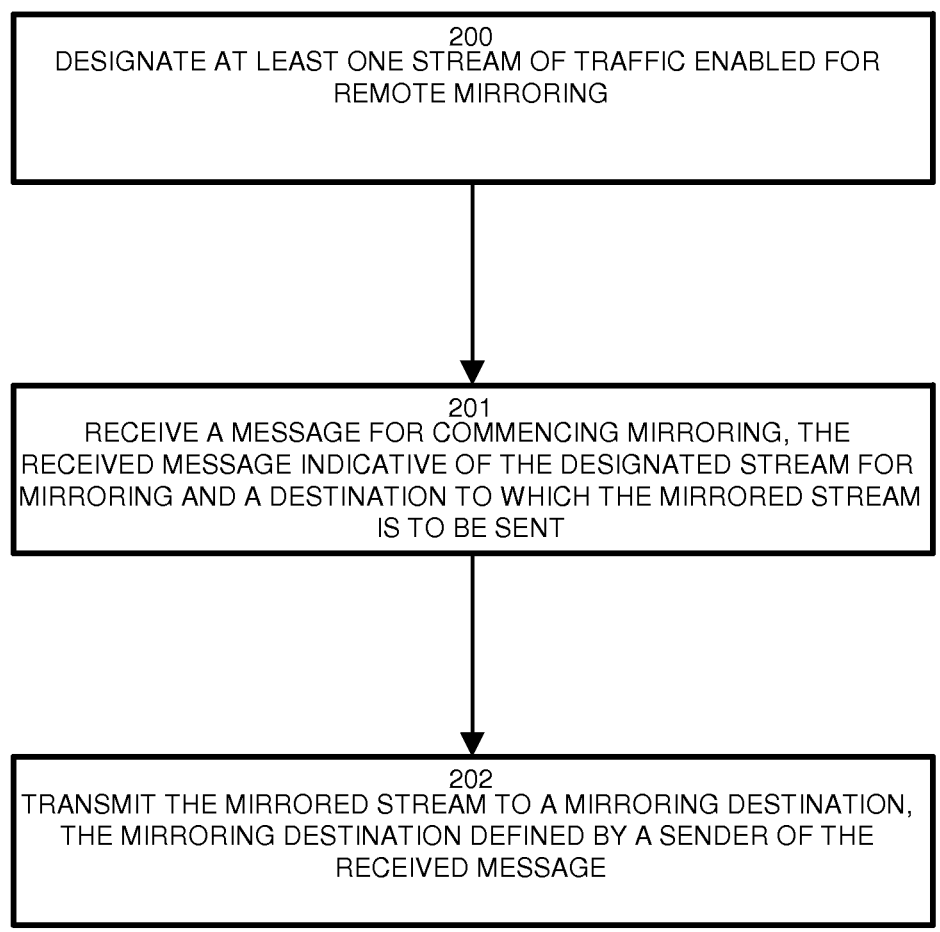
FIG. 2 is a flowchart of remote mirroring as disclosed herein.

FIG. 2 is a flowchart of remote mirroring as disclosed herein. Referring to FIGS. 1 and 2, the method of performing remote mirroring comprising as disclosed herein includes, at step 200, designating at least one stream of traffic enabled for remote mirroring. Designation of the stream may be in any suitable manner, as is typically expected to be based on port, source and destination of message traffic at a router or switching device from which the stream is mirrored. Traffic selection or filtering based on source or destination is typically employed to maintain a manageable volume of results, as mirroring all traffic to a particular port may be excessive.

Designating the stream for monitoring further includes assigning an identifier to the stream, such that the assigned identifier circumvents an alternate usage of the identifier. In the example arrangement, selection of a multicast group identifier denotes the designated stream, and the selected value operates as a flag such that the assigned identifier does not commence the alternate usage of multicast routing, but is instead designating the stream for mirroring by replacing, or "piggybacking" the assigned identifier as a multicast designator to enable use of protocols supporting multicast (e.g. IGMP).

The switch/router that is the source 110 of the mirrored stream 112 advertises the stream using a routing protocol such as ISIS (Intermediate System to Intermediate System) or PIM (Protocol-Independent Multicast). This allows the other switches/routers in the network to know who has a given mirror stream. A switch/router connected to a mirror destination 118-2 uses routing protocol exchanges to request the mirror stream from the source 110 that is advertising the stream. This ensures that a mirror stream can be delivered from any point in the network to any other point internal to the network.

Once designated, a host 126 may invoke a capture device for mirroring using the assigned identifier. The source router 110 or switching device from which the stream emanates receives a message 121 for commencing mirroring, such that the received message is indicative of the designated stream for mirroring and a destination to which the mirrored stream is to be sent, as depicted at step 201. The source router 110 transmits the mirrored stream 125 to a mirroring destination 124, such that the mirroring destination is defined by a sender 126 of the received message, as depicted at step 202.

Figure 3:
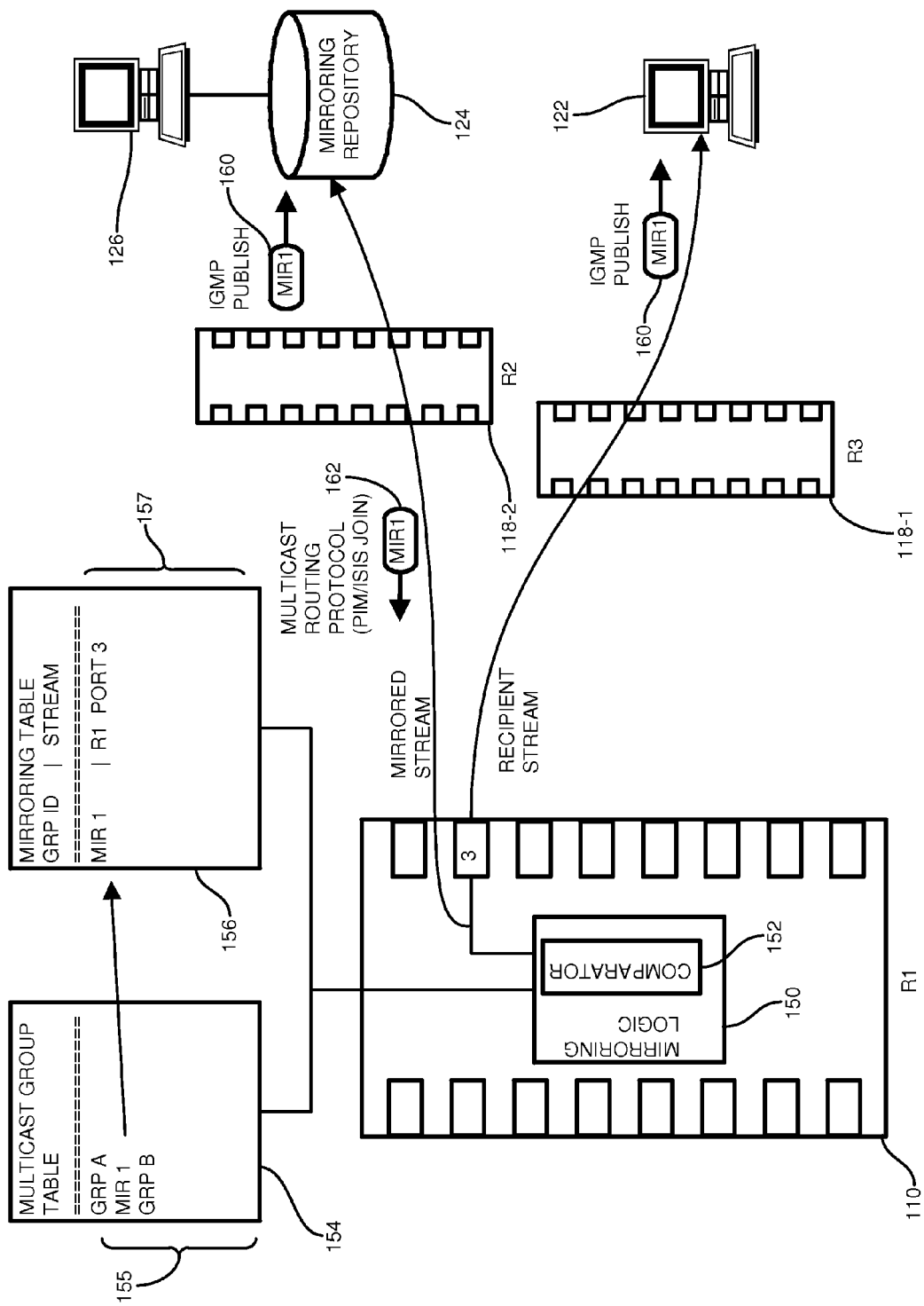
FIG. 3 is a messaging diagram of mirroring in the environment of FIG. 1.

FIG. 3 is a messaging diagram of mirroring in the environment of FIG. 1. Referring to FIGS. 1 and 3, in the mirroring environment 100, the source router 110 (R1) includes mirroring logic 150 and a comparator 152. In the example arrangement, in which the alternate usage is a multicast messaging protocol such as IGMP, the mirroring logic 150 couples to a multicast group table 154 and a mirroring table 156. The multicast group table 154 is operative with the alternate usage of multicast routing. The mirroring table includes entries 157 denoting streams enabled for mirroring, and identifies the router and port of the mirroring source. An optional filter may also be specified for selection of a specific source and/or destination. Each entry 157 includes an identifier ("MIR1") that emulates a group ID as a multicast group, and may have a corresponding entry 155 in the multicast group table.

The source router 110 publishes multicast groups corresponding to the entries 155 in the multicast group table. Such multicast publishing is an aspect of normal operation of the multicast route propagation across the network 116. The destination routers 118 receive the identifiers for which mirroring is enabled via a multicast publication message such as an IGMP publish message 160 from Host 126. In response to the publish message, the requestor 126 generates a Multicast Routing Protocol (such and PIM or ISIS or IGMP) join message 162 back to the source router 110. Upon receipt, the Multicast Routing protocol join message 162 is interpreted as a mirroring request because the identifier MIR1 matches with an entry 157 in the mirroring table 156, as determined by the comparator 152. In this manner, mirroring messages emulate the multicast messages in order to leverage the multicast protocol publication as a control medium to disseminate mirroring control messages. Having identified the Multicast Routing Protocol join request 162 as a mirroring request, the mirroring logic 150 commences mirroring to the capture device 124 specified by the host 126 in the join message 162. Typically, the capture device 124 is represented as the source/group multicast recipient.

Depending on the configuration, the actual mirror stream delivery may require encapsulating the packets in the stream using headers that the network can use to direct the mirror stream from its source towards the destination. In a SPB network, for example, Mac-In-Mac encapsulation may be used for this purpose. In a PIM network—the mirror stream may be encapsulated in a combined "IP Multicast+Ethernet" header. Such mechanisms may be used to support delivering the same mirror stream to multiple destinations. Also, these mechanisms may be used to support delivering more than one mirror stream to one or more destinations.

Figure 4:
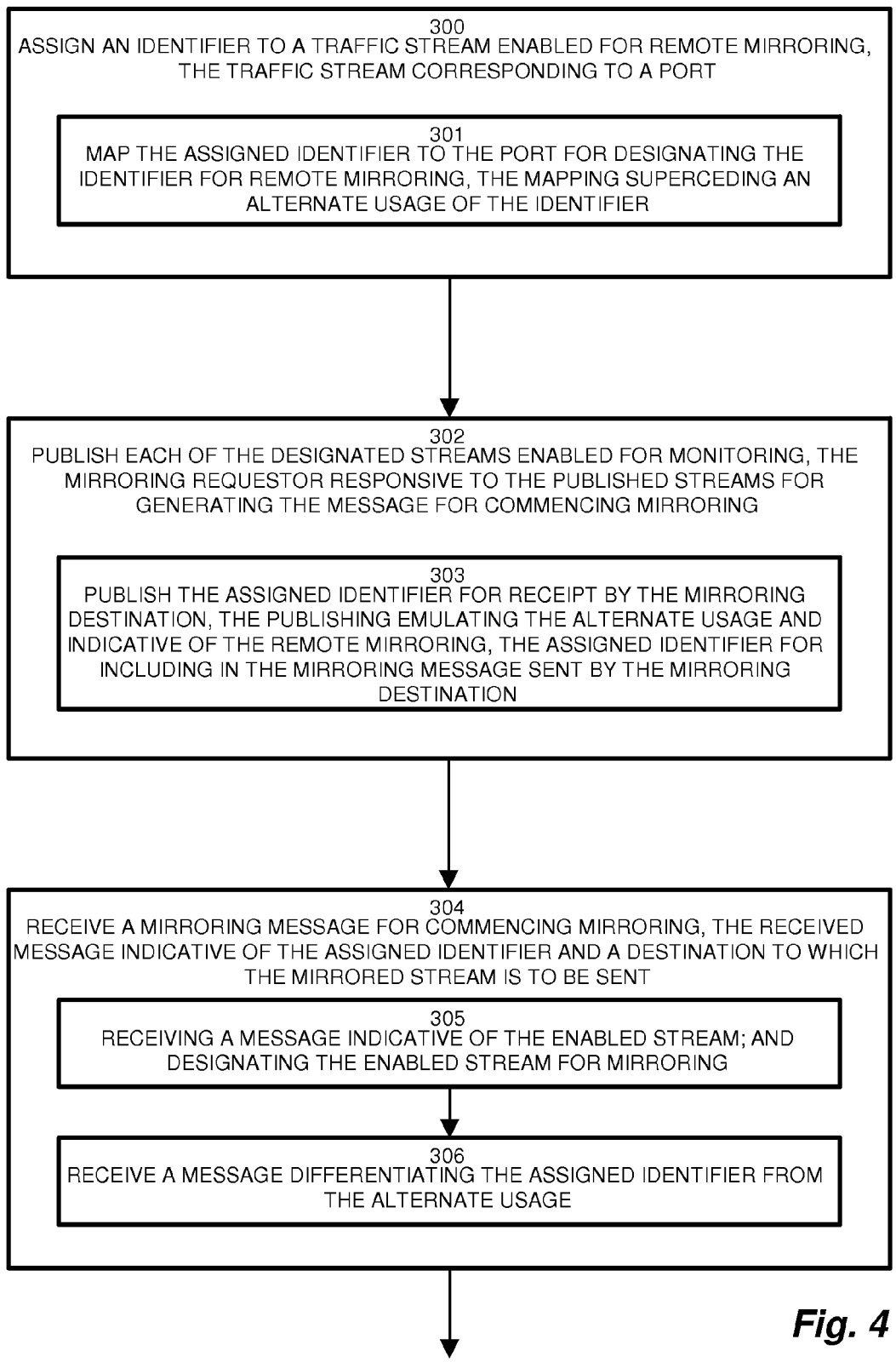
FIGS. 4 and 5 are a flowchart in greater detail of the mirroring of FIG. 3.
Figure 5:
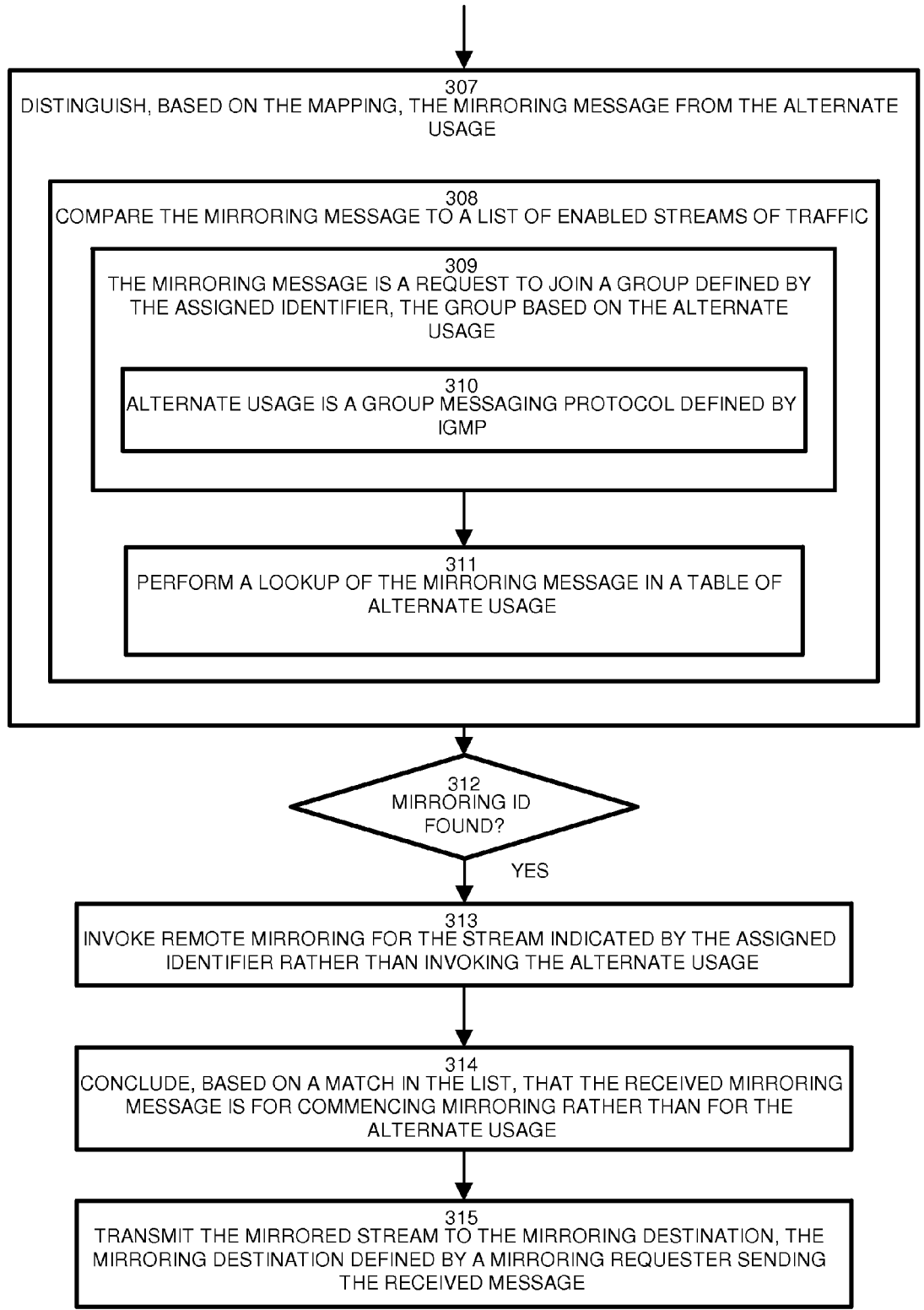

FIGS. 4 and 5 are a flowchart in greater detail of the mirroring of FIG. 3. Referring to FIGS. 1 and 3-5, the method of mirroring message traffic provided herein includes, at step 300, assigning an identifier to a traffic stream enabled for remote mirroring, such that the traffic stream corresponds to a port for mirroring. This includes mapping the assigned identifier to the port for designating the identifier for remote mirroring, such that the mapping supercedes an alternate usage of the identifier, as depicted at step 301. In the example arrangement, the alternate usage is multicast routing (via IGMP or other suitable multicast protocols). A host or other entity desiring to receive the mirrored stream identifies, at the mirroring requestor, the designated stream from this mapping 156.

This may be performed by publishing each of the designated streams enabled for monitoring, in which the mirroring requestor is responsive to the published streams for generating the message for commencing mirroring, as shown at step 302. Using the disclosed multicast approach, an IGMP publish command, typically employed for publishing multicast groups, is employed to propagate the available streams for mirroring. Accordingly, at step 303, the mirroring source publishes the assigned identifier for receipt by the mirroring destination, such that publishing emulates the alternate usage and is indicative of the remote mirroring request. The assigned identifier 121 is then included in the mirroring request message 162 sent by the mirroring destination 126. In the example arrangement using multicast, publishing further includes route propagation for multicast routing in an IP network using the IGMP publish message 160. The recipient/host 126 desiring to commence mirroring specifies the designated stream in the message 160 for commencing mirroring.

The mirroring source 110 receives the mirroring message 162 for commencing mirroring, in which the received message 162 is indicative of the assigned identifier 121 and a destination 124 to which the mirrored stream 120 is to be sent, as depicted at step 304. This includes receiving a message indicative of the enabled stream 112, as shown at step 305, and designating the enabled stream for mirroring4. The message 162 differentiates the assigned identifier from the alternate usage (IGMP), as depicted at step 306, based on a corresponding entry 157 in the mirroring table 156.

Upon receipt, the source 110 distinguishes, based on the mapping 156, the mirroring message 162 from the alternate usage 127, as depicted at step 307. This involves comparing the mirroring message 162 to a list 157 of enabled streams of traffic, as shown at step 308. As shown in FIG. 3, the stream identifier MIR1 appears in the mirroring table, and matches the mirroring message 162 emulating an IGMP join message with the group identifier MIR1. In the example arrangement, the mirroring message is a request to join a group defined by the assigned identifier, in which the group is based on the alternate usage 127. In the example, the alternate usage is a group messaging protocol defined by IGMP 127, however other alternate usages may also be employed for the publication and join (request) for mirroring. The source 110 performs a lookup of the mirroring message in a table of alternate usage, as shown at step 311.

A check is performed, at step 312, to determine if the mirroring ID (assigned identifier 121) is found in the mirroring table 156. If so, then the source 110 invokes remote mirroring for the stream 120 indicated by the assigned identifier rather than invoking the alternate usage of treating the message 162 as an IGMP join request, as disclosed at step 313. The source 110 concludes, based on a match in the list 157, that the received mirroring message 162 is for commencing mirroring rather than for the alternate usage, as depicted at step 314. The source 110 transmits the mirrored stream to the mirroring destination, such that the mirroring destination is defined by a mirroring requester 126 sending the received message 162.

In the example arrangement, employing multicast routing protocols as the mirroring control messaging medium in conjunction with the alternate usage IGMP, the following architectural framework may be employed.

Automatically instantiate a Mirror VSN. All control plane signaling and mirror traffic delivery for mirroring is handled under the scope of the Mirror VSN.

The originator of a mirror stream uses SPB IP Multicast TLVs to signal the availability of the stream for mirroring.

Automatically assign a unique IP Multicast address for each mirror stream originating from the node.

Assign a unicast source IP address for the mirror stream that represents the origination node. A good choice would be to convert the 20-bit SPB node nickname into a 32-bit unicast IP address.

Dynamically assign an ISID that will used as part of a Multicast Mac-In-Mac encapsulation header to send the mirror stream to its intended destinations using the SPB network as the transport.

Issue an IPMC TLV for (S, G, Data ISID, Mirror VSN Scope ISID) representing the mirror stream.

Issue the standard 802.1aq ISID Address TLV with TX bit set for the Data ISID (use a multicast BMAC_DA in the TLV).

Nodes that want to receive the mirror stream send the standard 802.1aq ISID Address TLV for the (Data ISID, Nickname) combination with the RX bit set. This allows the SPB Network to build forwarding state resulting in the stream being delivered to its intended destination(s).

Conventional approaches may include the following approaches. One conventional configuration includes mirroring subscriber data that is actually IP multicast. The proposed approach, on the other hand, uses IP addresses (multicast DA, unicast SA) only to represent target mirror traffic. There is no requirement that the traffic itself be multicast.

Other approaches concern mirroring of storage traffic, while the proposed approach is applicable to any traffic in the network. The conventional approach actually uses IP multicast addresses in the network layer headers for the storage traffic being mirrored. Rather, the disclosed configuration is for traffic that already has any kind of network layer headers. It handles any traffic in the network that the network administrator desires to mirror, including IP/Non-IP, multicast or unicast.

Other conventional approaches employ a unicast IP encapsulation and follow it with a NAT device that translates a unicast IP DA to a multicast IP DA. An IP multicast network that follows could then perform multicast routing on the packet and deliver the encapsulated packet to a destination switch/router. In contrast, the proposed approach differs because there is no showing of a network device where the mirror traffic originates is itself capable of multicast routing these packets. All indications are that it could only forward the packet out using the unicast IP DA, and subsequent multicast operations happen following a NAT. This typically requires at least two additional device (NAT and Multicast Router) or one additional device+1 Loopback or, No additional devices and 2-loopbacks. All of these options bring complexity or cost that the proposed approach avoids.

Further, this conventional approach requires that the network actually use IP multicast encapsulation. The claimed approach has no such requirement. The claimed approach may employ an IP multicast control plane. The forwarding plane does not have to use IP multicast headers (example SPB). Finally, this conventional approach requires substantial configuration and maintenance. In contrast, one of the features of the proposed approach is to make such mirroring configuration free.

Other approaches suggest the use of a Mac-In-Mac network to transport remote mirroring streams, without disclosing how remote mirroring streams are to be advertised and/or solicited, and discloses the forwarding plane portions of delivery in a SPB network. The claimed approach, in contrast, teaches control planes mechanisms to represent remote mirroring streams, advertise them and solicit them.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of mirroring message traffic comprising:
assigning an identifier to a traffic stream enabled for remote mirroring, the traffic stream corresponding to a port;
mapping the assigned identifier to the port for designating the identifier for remote mirroring, the mapping superceding a multicast group identifier;
receiving a mirroring message containing mirroring information for commencing mirroring, the mirroring message indicative of the assigned identifier and a destination to which a mirrored stream is to be sent;
wherein said mirroring information propagates via a multicast routing protocol and allows remote mirroring to be enabled from a remote capture device by capitalizing on the mirroring information emulating multicast information;
publishing the assigned identifier for receipt by the mirroring destination, the publishing emulating multicast routing and indicative of the remote mirroring, the assigned identifier for including in the mirroring message sent by the mirroring destination; and
transmitting the mirrored stream to the mirroring destination, the mirroring destination defined by a mirroring requester sending the mirroring message.

2. The method of claim 1 further comprising distinguishing, based on the mapping, the mirroring message from the multicast routing; and
invoking remote mirroring for the traffic stream indicated by the assigned identifier rather than invoking the multicast routing.

3. The method of claim 2 wherein the mirroring message is a request to join a group defined by the assigned identifier, the group based on the multicast routing.

4. The method of claim 3 wherein the multicast routing is a group messaging protocol defined by IGMP.

5. The method of claim 1 wherein publishing further comprises route propagation for multicast routing in an IP network.

6. The method of claim 1 further comprising:
identifying, at the mirroring requestor, the traffic stream; and
specifying the traffic stream in the mirrored message for commencing mirroring.

7. The method of claim 6 wherein identifying further comprises publishing each of the designated streams enabled for monitoring, the mirroring requestor responsive to the published streams for generating the mirrored message for commencing mirroring.

8. The method of claim 1 wherein receiving the mirroring message further includes receiving a message indicative of the traffic stream; and designating the enabled stream for mirroring.

9. The method of claim 1 wherein receiving the mirroring message further includes:
receiving a mirroring message differentiating the assigned identifier from the multicast routing;
comparing the mirroring message to a list of enabled streams of traffic; and
concluding, based on a match in the list, that the received mirroring message is for commencing mirroring rather than for the multicast routing.

10. The method of claim 1 wherein said receiving a message for commencing mirroring further comprises activating mirroring by inserting the multicast identifier in publish and join messages of a multicast protocol.

11. A network switching device with mirroring capability comprising:
- mirroring logic for generating an identifier to a traffic stream enabled for remote mirroring, the traffic stream corresponding to a port;
- a mapping table configured to mapping an association of an assigned identifier to the port for designating the identifier for remote mirroring, the mapping superceding a multicast group identifier;
- a network interface responsive to a mirroring requestor for a mirroring message containing mirroring information for commencing mirroring, the mirrored message indicative of the assigned identifier and a destination to which a mirrored stream is to be sent;
- wherein said mirroring information propagates via a multicast routing protocol and allows remote mirroring to be enabled from a remote capture device by capitalizing on the mirroring information emulating multicast information;
- the network interface configured to transmit the mirrored stream to the mirroring destination, the mirroring destination defined by the mirroring requester sending the mirroring message; and
- wherein the mirroring logic is configured to:
  - distinguish, based on the mapping, the mirroring message from multicast routing; and
  - invoke remote mirroring for the traffic stream indicated by the assigned identifier rather than invoking the multicast routing.

12. The network switching device of claim 11 wherein the mirroring message is a request to join a group defined by the assigned identifier, the group based on the multicast routing, the multicast routing being is a group messaging protocol defined by IGMP.

13. The network switching device of claim 11 further comprising a comparator for performing a lookup of the mirroring message in a table for determining multicast routing, and
concluding, based on the lookup, that the mirroring message is a request to commence mirroring.

14. The network switching device of claim 13 wherein the multicast routing is a protocol operable to publish the assigned identifier for receipt by the mirroring destination, the publishing emulating the multicast routing and indicative of the remote mirroring, the assigned identifier for including in the mirroring message sent by the mirroring destination.

15. The network switching device of claim 11 wherein the mirroring logic is further configured to:
- identify, at the mirroring requestor, the traffic stream; and
- specify the traffic stream in the mirroring message for commencing mirroring, wherein identifying further comprises publishing each of the designated streams enabled for monitoring, the mirroring requestor responsive to the published streams for generating the message for commencing mirroring.

16. The network switching device of claim 11 wherein the network switching device invokes the interface for receiving a mirroring message differentiating the assigned identifier from the multicast routing, and invokes the comparator for:
- comparing the mirroring message to a list of enabled streams of traffic; and
- concluding, based on a match in the list, that the received mirroring message is for commencing mirroring rather than for the multicast routing.

17. The network switching device of claim 11 wherein the assigned identifier includes an IP source address and IP multicast destination address, the assigned identifier responsive to a request to join a multicast group.

18. The network switching device of claim 11 further comprising designating a subset range of multicast addresses for the assigned identifier, the subset range distinct from multicast addresses employed for multicast usage.

19. The network switching device of claim 17 wherein the assigned identifier employing an upper 12 bits for storing a node identifier and a lower 12 bits as a source of the mirrored stream.

20. The network switching device of claim 11 wherein said received message for commencing mirroring further comprises activating mirroring by inserting the multicast identifier in publish and join messages of a multicast protocol.

* * * * *